United States Patent
Lake et al.

(10) Patent No.: US 11,474,734 B1
(45) Date of Patent: Oct. 18, 2022

(54) TRACKING DATA MIRROR DIFFERENCES

(71) Applicant: EMC IP Holding Company LLC, Hopkinton, MA (US)

(72) Inventors: Brian Lake, Edmonton (CA); Victor Salamon, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/307,558

(22) Filed: May 4, 2021

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01); *G06F 3/0614* (2013.01); *G06F 3/0659* (2013.01)

(58) Field of Classification Search
None
See application file for complete search history.

(56) References Cited

U.S. PATENT DOCUMENTS

| | | | | |
|---|---|---|---|---|
| 6,862,671 B1 * | 3/2005 | Bergsten | ............ | G06F 11/2082 711/202 |
| 8,046,548 B1 * | 10/2011 | Chatterjee | ............ | G06F 11/2064 711/135 |
| 9,383,937 B1 * | 7/2016 | Frank | ............ | G06F 3/0655 |
| 2005/0251633 A1 * | 11/2005 | Micka | ............ | G06F 11/2082 714/E11.107 |
| 2007/0186068 A1 * | 8/2007 | Agrawal | ............ | G06F 11/1464 714/E11.12 |
| 2016/0283329 A1 * | 9/2016 | Natanzon | ............ | G06F 11/1464 |
| 2016/0371183 A1 * | 12/2016 | Long | ............ | G06F 3/0659 |
| 2019/0340075 A1 * | 11/2019 | Ramachandran | ... | G06F 11/1451 |

OTHER PUBLICATIONS

Disk mirroring, https://en.wikipedia.org/w/index.php?title=Disk_mirroring&oldid=1003882456 (last visited May 4, 2021).

* cited by examiner

*Primary Examiner* — William E. Baughman
(74) *Attorney, Agent, or Firm* — Ryan, Mason & Lewis, LLP

(57) ABSTRACT

Methods, apparatus, and processor-readable storage media for tracking data mirror differences are provided herein. An example computer-implemented method includes obtaining a request to start tracking data differences between a plurality of data mirror volumes of a storage system, wherein the storage system is configured to apply at least a first data tracking technique that tracks the data differences using one or more bitmap records and a second data tracking technique that tracks the data differences using or more journal records; selecting at least one of the first data tracking technique and the second data tracking technique using one or more selection criteria; and tracking the data differences in accordance with the selected at least one data tracking technique.

20 Claims, 8 Drawing Sheets

TRACKING DATA MIRROR DIFFERENCES

FIELD

The field relates generally to information processing systems, and more particularly to protecting data in such systems.

BACKGROUND

Storage systems often apply mirroring techniques to protect against data loss and to ensure data availability. Such mirroring techniques often include replicating data across separate data mirrors.

SUMMARY

Illustrative embodiments of the disclosure provide techniques for tracking data mirror differences. In one embodiment, an exemplary computer-implemented method can include obtaining a request to start tracking data differences between a plurality of data mirror volumes of a storage system, wherein the storage system is configured to apply at least a first data tracking technique that tracks the data differences using one or more bitmap records and a second data tracking technique that tracks the data differences using or more journal records; selecting at least one of the first data tracking technique and the second data tracking technique using one or more selection criteria; and tracking the data differences in accordance with the selected at least one data tracking technique.

Illustrative embodiments of the disclosure can provide significant advantages relative to conventional techniques for tracking mirror differences. For example, one or more challenges associated with tracking data mirror differences are overcome by the disclosed techniques through selectively switching between different tracking implementations to provide one or more of improved storage efficiency and improved data protection.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

When applying data mirroring techniques, if a data mirror becomes disconnected and new data is written to the remaining data mirrors, the disconnected mirror is no longer up to date. When the disconnected mirror reconnects, redundancy can be restored by performing a full or partial rebuild of the disconnected mirror. A full rebuild requires substantial bandwidth and time, which can affect the availability and performance of the storage system. To address this, some storage systems perform a partial rebuild of a mirror by tracking a subset of new data that is written to the remaining data mirrors subsequent to the disconnect. When the disconnected mirror reconnects, only the tracked differences are written to the disconnected mirror. Current storage systems require a tradeoff between the resources that might be needed to perform a full rebuild of the disconnected mirror and the increased storage resources for tracking data differences in order to perform a partial rebuild of the disconnected mirror.

Figure 1:
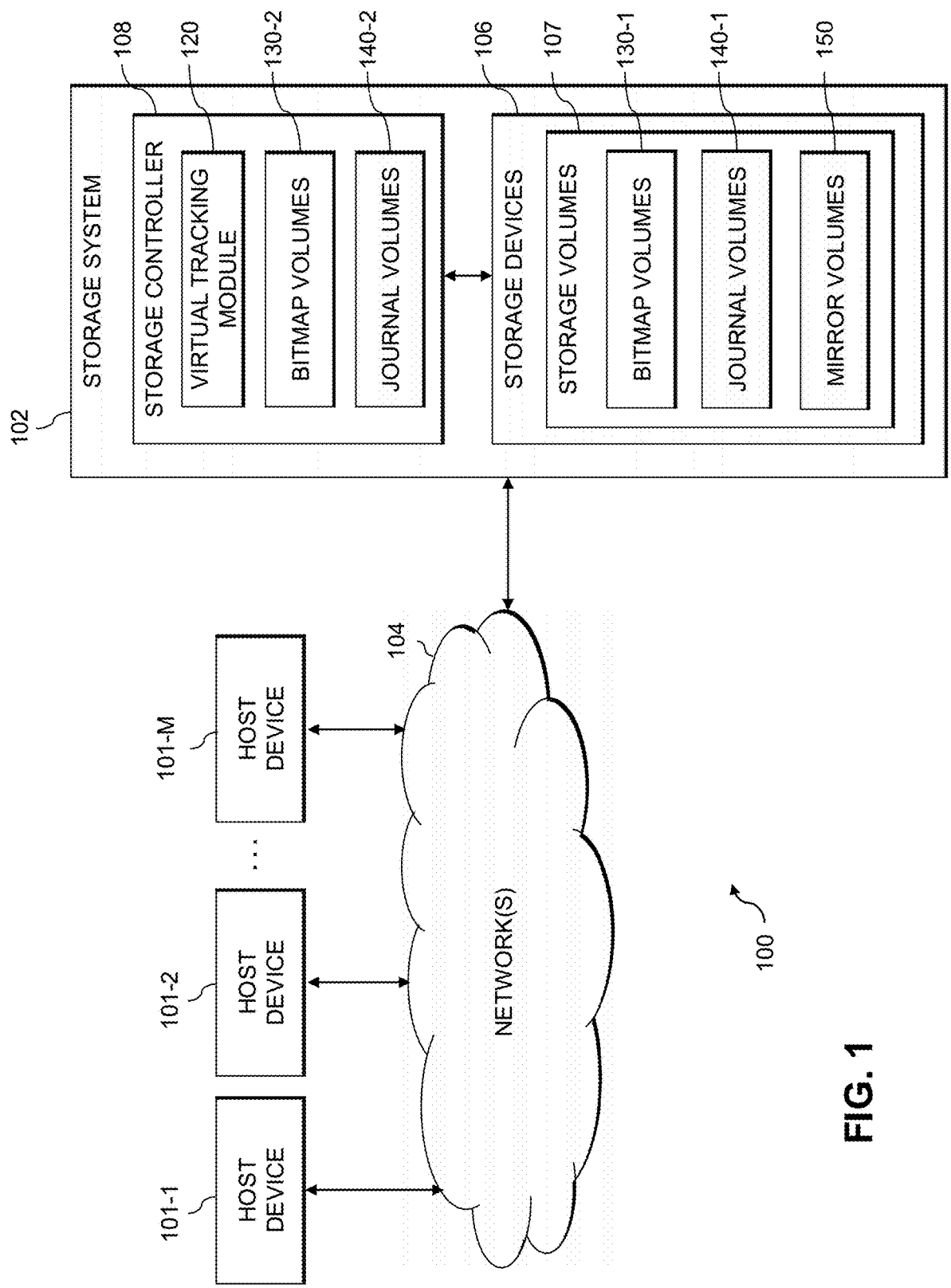
FIG. 1 shows an information processing system configured for tracking data mirror differences in an illustrative embodiment of the disclosure.

FIG. 1 shows an information processing system 100 configured in accordance with an illustrative embodiment. The information processing system 100 comprises a plurality of host devices 101-1, 101-2, . . . 101-M, collectively referred to herein as host devices 101, and a storage system 102. The host devices 101 are configured to communicate with the storage system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the storage system 102. The term "input-output" as used herein refers to at least one of input and output. For example, IO operations may comprise write requests and/or read requests directed to logical addresses of a particular logical storage volume of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 and an associated storage controller 108. The storage devices 106 store data of a plurality of storage volumes 107. The storage volumes 107 illustratively comprise respective logical units (LUNs) or other types of logical storage volumes. The term "storage volume" as used herein is intended to be broadly construed, and should not be viewed as being limited to any particular format or configuration.

In the FIG. 1 embodiment, the storage system 102 includes one or more journal volumes and one or more bitmap volumes. The one or more bitmap volumes may be implemented as one or more bitmap volumes 130-1 within storage volumes 107 and/or as one or more bitmap volumes 130-2 within storage controller 108, for example. Similarly, the one or more journal volumes may be implemented as one or more journal volumes 140-1 within storage volumes 107 and/or as one or more journal volumes 140-2 within storage controller 108. In the FIG. 1 embodiment, the storage volumes 107 also include one or more mirror volumes 150. In at least some embodiments, the one or more bitmap volumes 130 and the one or more journal volumes 140 are used to track differences between mirror volumes 150 based on one or more data tracking techniques determined using virtual tracking module 120, as described in more detail elsewhere herein.

The storage devices 106 of the storage system 102 illustratively comprise solid state drives (SSDs). Such SSDs are implemented using non-volatile memory (NVM) devices such as flash memory. Other types of NVM devices that can be used to implement at least a portion of the storage devices include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in in the storage system 102.

It is therefore to be appreciated numerous different types of storage devices 106 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as an XtremIO™ storage array from Dell Technologies. A wide variety of other types of distributed or non-distributed storage arrays can be used in implementing the storage system 102 in other embodiments, including by way of example one or more Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The MPIO driver may comprise, for example, an otherwise conventional MPIO driver, such as a PowerPath® driver from Dell Technologies. Other types of MPIO drivers from other driver vendors may be used.

The storage controller 108 of storage system 102 in the FIG. 1 embodiment includes virtual tracking module 120. Functionality for tracking data mirror differences in the storage system 102 are illustratively performed at least in part by the storage controller 108, utilizing its virtual tracking module 120, in a manner to be described in more detail elsewhere herein.

The storage controller 108 and the storage system 102 may further include one or more additional modules and other components typically found in conventional implementations of storage controllers and storage systems, although such additional modules and other components are omitted from the figure for clarity and simplicity of illustration.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in geographic locations that are remote from the first geographic location. Thus, it is possible in some implementations of the system 100 for the host devices 101 and the storage system 102 to reside in different data centers. Numerous other distributed implementations of the host devices and the storage system 102 are possible.

Additional examples of processing platforms utilized to implement host devices 101 and storage system 102 in illustrative embodiments will be described in more detail below in conjunction with FIGS. 7 and 8.

It is to be appreciated that these and other features of illustrative embodiments are presented by way of example only, and should not be construed as limiting in any way.

Accordingly, different numbers, types, and arrangements of system components such as host devices 101, storage system 102, network 104, storage devices 106, storage volumes 107, storage controller 108, and virtual tracking module 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process utilizing virtual tracking module 120 will be described in more detail with reference to the flow diagram of FIG. 6.

Some embodiments described herein can selectively apply one or more data tracking techniques to track differences between a plurality of data mirrors when access to one or more of the data mirrors is lost. Examples of such data tracking techniques include a bitmap logging technique and a journal logging technique.

As an example, the techniques may be applied when all of the data mirrors are up-to-date and then one of the data mirrors disconnects. In such an example, some embodiments begin tracking the differences when there is at least one write to a data mirror that is still connected. As another example, the techniques may be applied when there are a number, N, of data mirrors and a new data mirror is added, in which case, the techniques can track the synchronization progress of the new mirror while new writes are processed.

Figure 2:
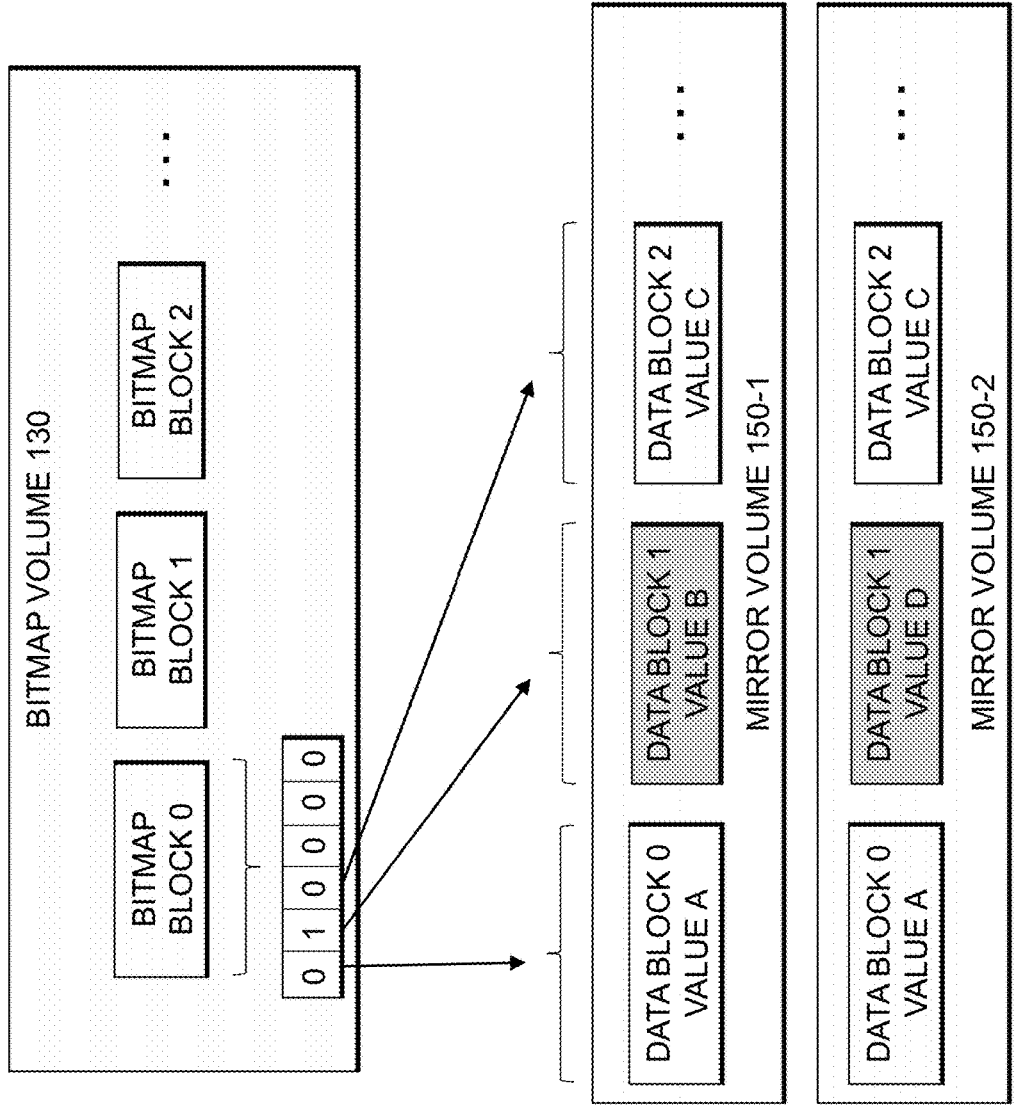
FIG. 2 shows an example of a first implementation for tracking data mirror differences in accordance with exemplary embodiments.

FIG. 2 shows an example of a bitmap logging technique in accordance with an exemplary embodiment. In the example shown in FIG. 2, a bitmap volume 130 tracks differences between two of the mirror volumes 150, namely, 150-1 and 150-2, although it is to be appreciated that such techniques apply to situations when there are more than two mirrors. Generally, the bitmap volume stores a log that includes one bit for each data block on the mirror volumes 150-1 and 150-2, and the value of a bit is set to "1" if the corresponding block on the two mirror volumes 150-1, 150-2 is different. In the example shown in FIG. 2, it can be seen that mirror volumes 150-1 and 150-2 have the same values for data blocks 0 and 2, but a different value for data block 1 as indicated by the shading at data blocks 1. As such, the portion of the bitmap corresponding to data blocks 0-2 is set to "010".

Figure 3:
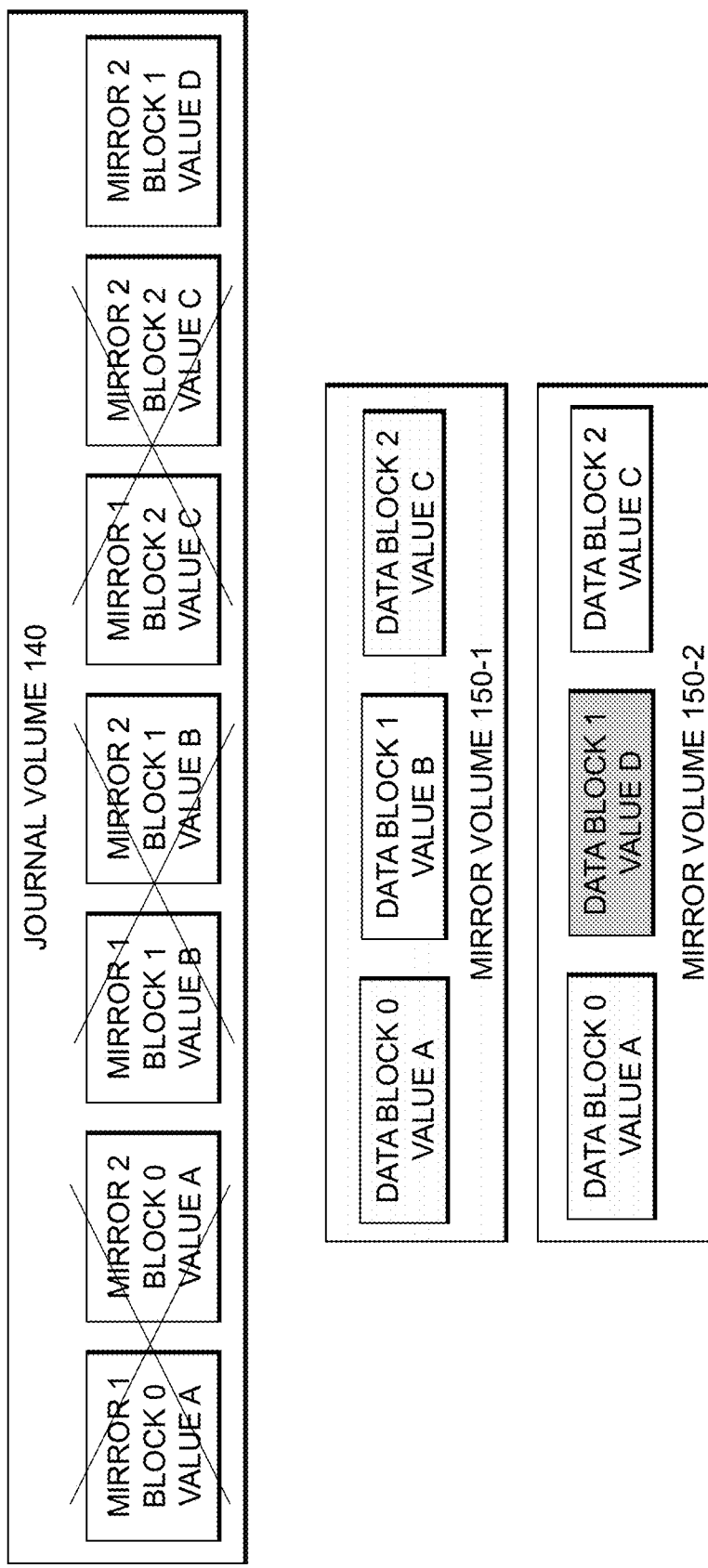
FIG. 3 shows an example of a second implementation for tracking data mirror differences in accordance with exemplary embodiments.

FIG. 3 shows an example of a journal logging technique in accordance with an exemplary embodiment. In the example shown in FIG. 3, a journal volume 140 logs the IO operations corresponding to the mirror volumes 150-1 and 150-2. The mirror volumes 150-1 and 150-2 in FIG. 3 represent the current state following the seven operations shown in journal volume 140. More specifically, the first six IO operations shown in the journal volume 140 include writing values A, B, and C to data blocks 0, 1, and 2 at the respective mirror volumes 150-1 and 150-2. The last IO operation replaces the value B in the mirror volume 150-2 at block 1 with value D as indicated by the shading in FIG. 3. Value D is not written to mirror volume 150-1. In this example, the first six IO operations are expunged in the journal volume 140 (as indicated by the X's) to save space as the same values are written to each of the mirror volumes 150-1 and 150-2. Since there is no corresponding IO operation writing value D to mirror volume 150-2, this difference is tracked in journal volume 140.

Generally, bitmap logging techniques more efficiently use storage as only one bit is required per block of data. However, the size required by the bitmap logging technique is proportional to the mirror size, regardless of the amount of discrepancy between data mirrors. Additionally, bitmaps only record the fact that there is a difference between mirrors, but do not indicate the actual data that is different or preserve the order the data is written.

On the other hand, journal logging techniques use storage based on the number of differences between the data mirrors; optionally, can record a copy of the data that is different; and preserve write-order fidelity by creating one journal record per mirror write. However, journal logging techniques require a larger footprint (e.g., block number per write). As such, if the data differences between data mirrors grow, the storage used by the journal can become more than what the bitmap log would use. Further, multiple records are created per block, in particular, one record is needed per new block write even if it is for the same block.

Bitmap logs can be overprovisioned when only a small number of differences between data mirrors needs to be tracked, in which case a journal implementation is more efficient. This overprovisioning can be costly particularly when the tracking needs to be persisted on mission-critical storage. Additionally, the bitmap logs carry critical information and can benefit from an extra layer of redundancy. For example, if the last bitmap log mirror is lost (or is never setup), then the last bitmap log is also lost. In this case, a full rebuild is needed when the data mirror is reattached, which is time consuming and reduces data mirror redundancy.

Accordingly, at least some embodiments described herein reduce the amount of provisioned space that is needed to track differences between data mirrors at least in part by combining and/or stacking multiple different tracking methods (e.g., bitmap logging and journal logging) to track the differences; and automatically switch between such multiple methods based on the current conditions. Additionally, one or more embodiments enable a journal to be attached to a bitmap log to add redundancy, and automatically make use of the journal to track differences in data mirrors when bitmap log redundancy goes below a certain threshold (e.g., when the amount of bitmap log mirrors goes down to 1 or 0).

One example embodiment includes a hybrid tracker implementation that balances between multiple tracking techniques. For example, a virtual tracker volume, which in some embodiments is implemented at least in part by virtual tracking module 120, is configured to receive requests from an IO driver to track differences between a set of two or more mirrors.

The virtual tracker volume records the storage space utilized in each of the tracking implementations (e.g., journal logging and bitmap logging). In some example embodiments, the data mirror differences may be stored synchronously or asynchronously for each tracker implementation. For example, a synchronous implementation can reduce differences between data mirrors at the latency cost of having to wait for both data and tracker writes to finish before a host that initiated the IO is acknowledged. An asynchronous implementation provides better performance but can lead to more differences between the data mirrors.

Optionally, the virtual tracker volume enables each of the tracking implementations to store data mirror differences in different fault domains. As a non-limiting example, a given tracking implementation may store data mirror differences in at last one of an IO node and a SAN. Accordingly, for a storage system that has multiple IO nodes that serve IO operations to the same SAN, the virtual tracker volume can distribute each tracker write to the multiple IO nodes to keep the storage contents consistent across the multiple IO nodes. By way of example, a journal mirror can be provisioned within a data node, and bitmap logs can be provisioned in the SAN to provide additional protection against a SAN connection failure.

In some embodiments, each of the tracker implementations (e.g., journal and bitmap logs) may have their own mirrors, regardless of the fault domain, thereby creating one or more additional layers of redundancy. In such embodiments, the mirror of the tracker implementation may include its own meta-tracker to track differences between trackers, so that the tracker itself can be rebuilt if necessary. When the meta-tracker is implemented within the IO node, multiple copies may be kept consistent by synchronizing between multiple nodes within in the storage system.

The virtual tracker volume in at least some embodiments, determines where to track the differences between the data mirrors, such as within a journal log or a bitmap log, for example. The virtual tracker volume may be configured with one or more policies. Such a policy may be configured by a storage administrator and can describe how to combine multiple tracker implementations and fault domains, as described in more detail in conjunction with FIGS. 4 and 5, for example.

The virtual tracker volume, in at least one embodiment, may implement a common interface for an IO driver, which is independent of the managed tracker implementations. As a non-limiting example, the common interface may include an application programming interface (API) having at least the following functions: write difference for block range X between mirror M1 and mirror M2; clear difference for block range X between mirrors M1 and M2; and get the next difference (which can be used by the IO Driver to extract differences to synchronize the mirrors).

Figure 4:
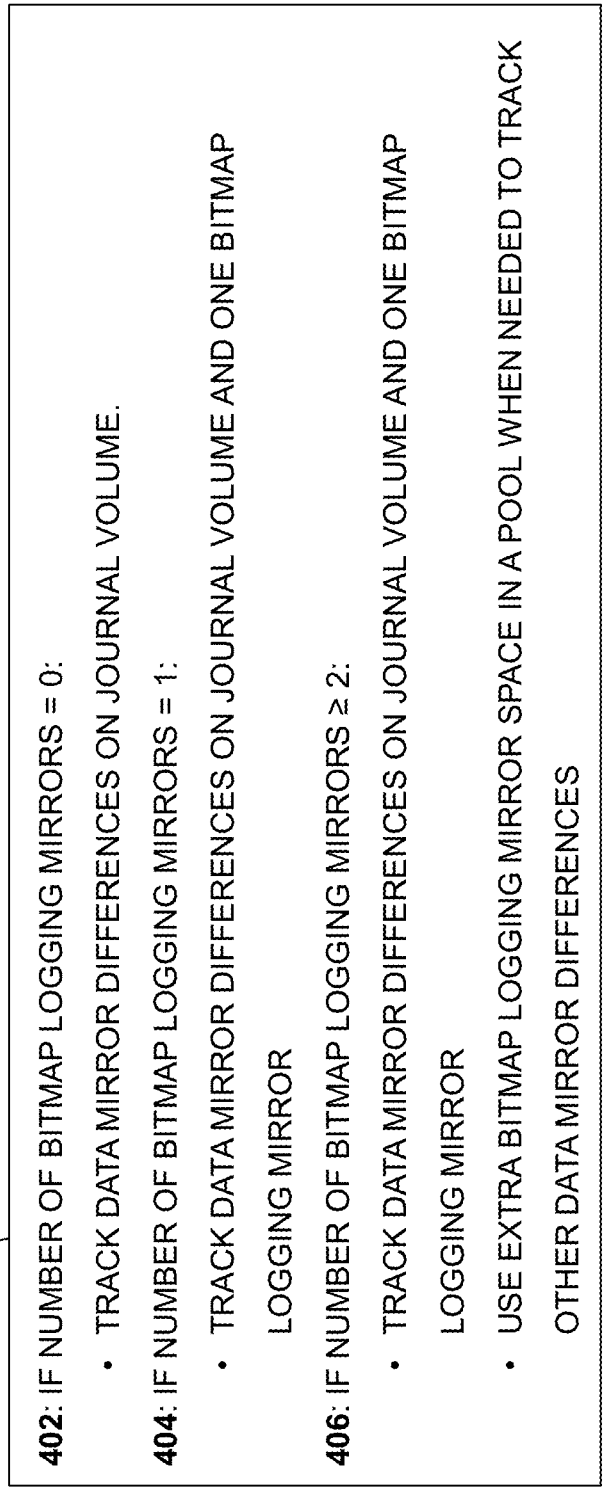
FIG. 4 shows example pseudocode for implementing at least a portion of a first process for selecting data tracking techniques in an illustrative embodiment.

As noted above, the virtual tracker volume may decide which fault domain and which implementation to use to track differences between data mirrors according to an algorithm in a policy. FIG. 4 shows example pseudocode for implementing a first algorithm for selecting data tracking techniques in an illustrative embodiment. In this embodiment, example pseudocode 400 is executed by or under the control of at least one processing system and/or device. For instance, the example pseudocode 400 may be viewed as comprising a portion of a software implementation of at least part of virtual tracker module 120 of the storage system 102 of the FIG. 1 embodiment.

Generally, the example pseudocode 400 can be used to increase tracker redundancy, and thus reduce the costs of mirror rebuilds.

Step 402 includes determining if the number of bitmap logging mirrors is down to 0, and if so, tracking the data differences on a journal volume.

Step 404 includes determining if the number of bitmap logging mirrors is down to 1, and if so, tracking the data differences on the journal volume and on the one bitmap logging mirror.

Step 406 includes determining if the number of bitmap logging mirrors is greater than or equal to 2, and if so, tracking the data differences on the journal volume and the one bitmap logging mirror and adding the extra bitmap logging mirror space in a pool when needed to track other data mirror differences.

Figure 5:
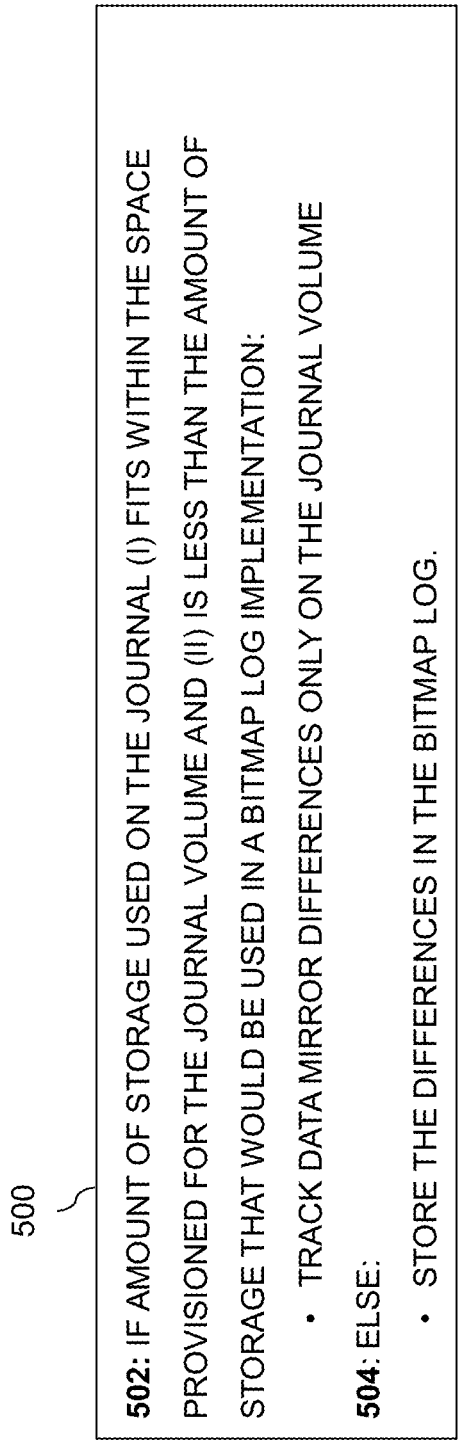
FIG. 5 shows example pseudocode for implementing at least a portion of a second process for selecting data tracking techniques in an illustrative embodiment.

FIG. 5 shows example pseudocode for implementing at least a portion of a second process for selecting data tracking techniques in an illustrative embodiment. In this embodiment, example pseudocode 500 is executed by or under the control of at least one processing system and/or device. For instance, the example pseudocode 500 can be viewed as comprising a portion of a software implementation of at least part of virtual tracker module 120 of the storage system 102 of the FIG. 1 embodiment.

Generally, the example pseudocode 500 can be used to increase storage efficiency, thereby reducing storage costs.

Step 502 includes tracking data mirror differences only on a journal volume if the amount of storage used by the journal volume (i) fits within the space provisioned for the journal volume and (ii) is less than the amount of storage that would be used by a bitmap log implementation. Otherwise, step 504 includes storing the data mirror differences in a bitmap log.

It is noted that the amount of storage used in the journal implementation is proportional to the number of entries stored in the journal. Accordingly, if the data differences between the data mirrors continue to grow (e.g., due to a prolonged outage), then the second threshold in step 502 will be crossed since the amount of storage used for the journal is less than the amount of storage that would be used in a bitmap log implementation, and the algorithm will switch from the journal implementation to the bitmap log, replaying the journal entries.

It is to be appreciated that the example pseudocodes shown in FIGS. 4 and 5 are merely examples of processes for selecting data tracking techniques, and alternative implementations of the processes can be used in other embodiments.

It is noted that the policies applied by the virtual volume tracker are highly configurable. As such, a storage administrator can modify such policies or add new policies. For example, the virtual volume tracker may be configured to apply a default policy (such as the algorithm depicted by pseudocode 400), which can be adjusted, replaced, or changed as needed.

Figure 6:
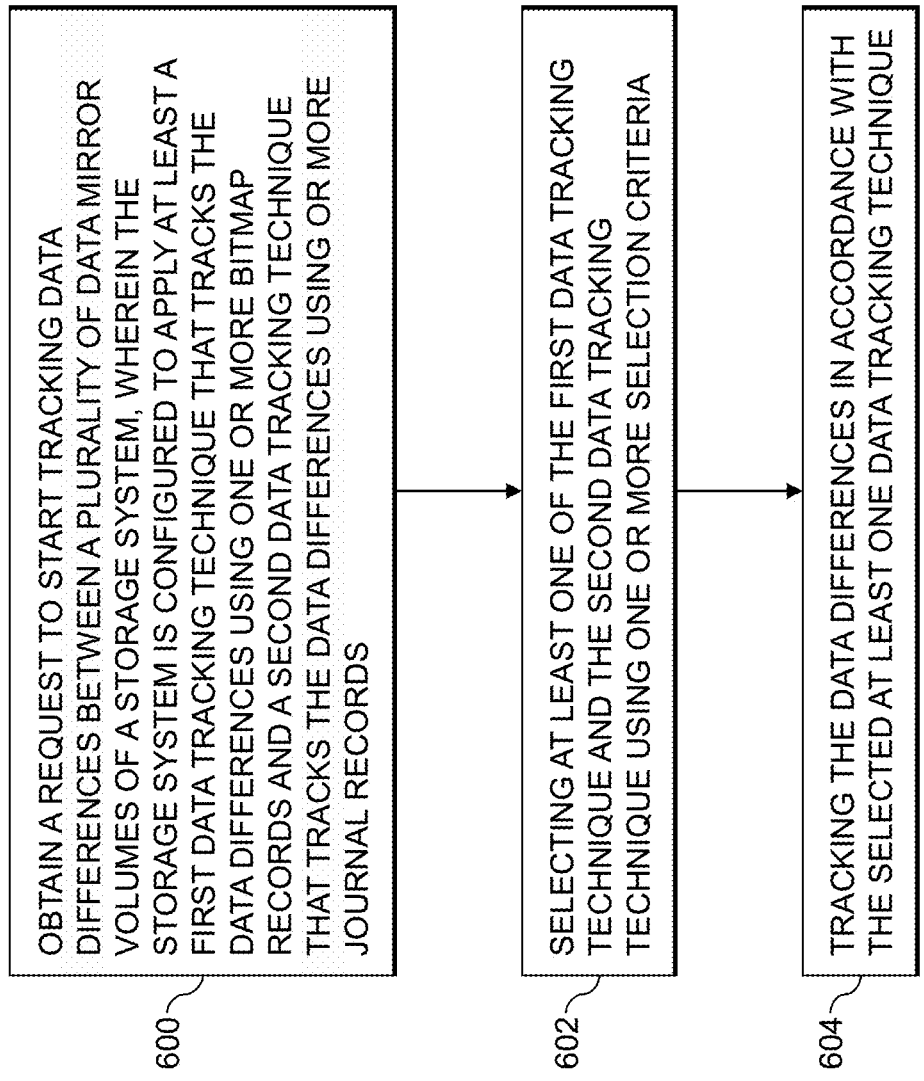
FIG. 6 is a flow diagram of a process for tracking mirror differences in an illustrative embodiment.

FIG. 6 is a flow diagram of a process for tracking mirror differences in an illustrative embodiment. It is to be understood that this particular process is only an example, and additional or alternative processes can be carried out in other embodiments.

In this embodiment, the process includes steps 600 through 604. These steps are assumed to be performed by the storage controller 108 utilizing its virtual tracking module 120. Step 600 includes obtaining a request to start tracking data differences between a plurality of data mirror volumes of a storage system, wherein the storage system is configured to apply at least a first data tracking technique that tracks the data differences using one or more bitmap records and a second data tracking technique that tracks the data differences using or more journal records. Step 602 includes selecting at least one of the first data tracking technique and the second data tracking technique using one or more selection criteria. Step 604 includes tracking the data differences in accordance with the selected at least one data tracking technique.

The first data tracking technique may include a bitmap logging technique that stores the one or more bitmap records in one or more bitmap volumes. The second data tracking technique may include a journal logging technique that stores the one or more journal records in one or more journal volumes. The process may include at least one of: using a first one of the bitmap volumes as a data mirror for at least a second one of the bitmap volumes; and using a first one of the journal volumes as a data mirror for at least a second one of the journal volumes. At least one of the bitmap volumes may be stored in a different fault domain than at least one of the journal volumes. At least one of the bitmap volumes may be stored in a different fault domain than at least one of the journal volumes. A given fault domain may correspond to at least one of: a particular one of multiple IO nodes associated with the storage system; a particular storage device associated with the storage system; and a particular set of storage devices associated with the storage system. The one or more selection criteria may include at least one of: an amount of storage available to at least to one of the first data tracking technique and the second data tracking technique; a number of volumes available to at least one of the first data tracking technique and the second data tracking technique to track the data differences; and a number of write operations that result in data differences between the plurality of data mirror volumes. The process may include monitoring an amount of storage used by each of the first data tracking technique and the second data tracking technique. The process may include providing a common interface for the first data tracking technique and the second data tracking technique to one or more IO drivers of the storage system. The process may include, in response to regaining access to the at least one of the plurality of data mirror volumes, synchronizing the at least one of the plurality of data mirror volumes based on the tracked data differences. The tracking may include automatically switching the selected at least one data automatically switching technique to a different one of the at least one of the first and second data tracking techniques based at least in part on the one or more selection criteria.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to selectively switch between different tracking implementations. These and other embodiments can effectively improve one or more of: storage efficiency of tracking mirror differences, the time and bandwidth required to rebuild data mirrors, data availability of storage systems, and protection against connection failure (e.g., involving SAN or NAS).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for tracking data mirror differences in a storage system will now be described in greater detail with reference to FIGS. 7 and 8. Although described in the context of system 100, these platforms may also be used to implement at least portions of other information processing systems in other embodiments.

Figure 7:
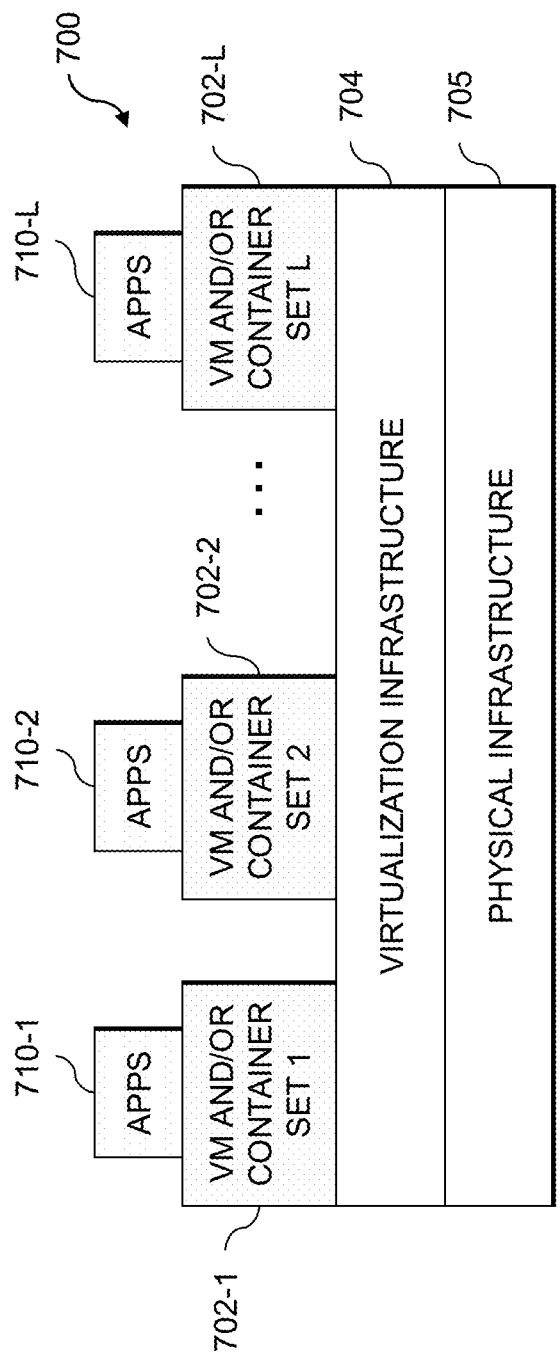
FIGS. 7 and 8 show examples of processing platforms that may be utilized to implement at least a portion of an information processing system in illustrative embodiments.
Figure 8:
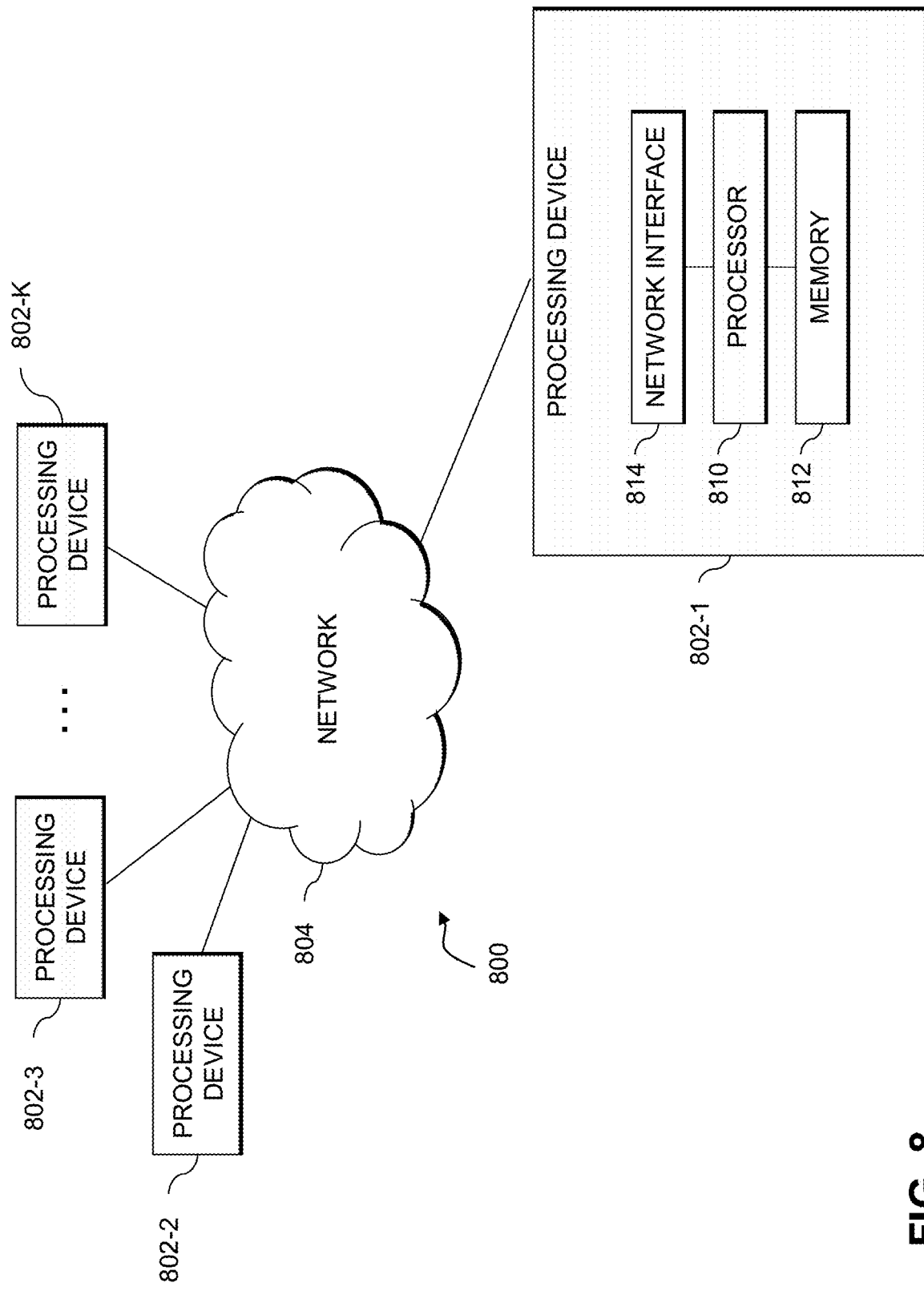

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide functionality for tracking data mirror differences in a storage system of the type described above using one or more processes running on a given one of the VMs. For example, each of the VMs can implement virtual tracking module 120 and/or other components for implementing functionality for tracking data mirror differences in the storage system 102.

A hypervisor platform may be used to implement a hypervisor within the virtualization infrastructure 704. Such a hypervisor platform may comprise an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can also provide functionality for tracking data mirror differences in a storage system of the type described above. For example, a container host device supporting multiple containers of one or more container sets can implement one or more instances of the virtual tracking module 120 and/or other components for implementing functionality for tracking data mirror differences in the storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, ... 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 812 may comprise RAM, read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™ VxRack™ FLEX, VxBlock™, or Vblock® converged infrastructure from Dell Technologies.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for tracking data mirror differences in a storage system of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, storage controllers, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining a request to start tracking data differences between a plurality of data mirror volumes of a storage system, wherein the storage system is configured to apply at least a first data tracking technique that tracks the data differences using one or more bitmap records and a second data tracking technique that tracks the data differences using or more journal records;
   selecting at least one of the first data tracking technique and the second data tracking technique using one or more selection criteria; and
   tracking the data differences in accordance with the selected at least one data tracking technique;
   wherein the method is performed by at least one processing device comprising a hardware processor.

2. The computer-implemented method of claim 1, wherein:
   the first data tracking technique comprises a bitmap logging technique that stores the one or more bitmap records in one or more bitmap volumes; and
   the second data tracking technique comprises a journal logging technique that stores the one or more journal records in one or more journal volumes.

3. The computer-implemented method of claim 2, comprising at least one of:
   using a first one of the bitmap volumes as a data mirror for at least a second one of the bitmap volumes; and
   using a first one of the journal volumes as a data mirror for at least a second one of the journal volumes.

4. The computer-implemented method of claim 2, wherein at least one of the bitmap volumes is stored in a different fault domain than at least one of the journal volumes.

5. The computer-implemented method of claim 4, wherein a given fault domain corresponds to at least one of:
   a particular one of multiple input-output nodes associated with the storage system;
   a particular storage device associated with the storage system; and
   a particular set of storage devices associated with the storage system.

6. The computer-implemented method of claim 1, wherein the one or more selection criteria comprise at least one of:
   an amount of storage available to at least to one of the first data tracking technique and the second data tracking technique;
   a number of volumes available to at least one of the first data tracking technique and the second data tracking technique to track the data differences; and
   a number of write operations that result in data differences between the plurality of data mirror volumes.

7. The computer-implemented method of claim 1, comprising:
   monitoring an amount of storage used by each of the first data tracking technique and the second data tracking technique.

8. The computer-implemented method of claim 1, comprising:
   providing a common interface for the first data tracking technique and the second data tracking technique to one or more input-output drivers of the storage system.

9. The computer-implemented method of claim 1, wherein the request is obtained in response to losing access to at least one of the plurality of data mirror volumes.

10. The computer-implemented method of claim 9, comprising:
    in response to regaining access to the at least one of the plurality of data mirror volumes, synchronizing the at least one of the plurality of data mirror volumes based at least in part on the tracked data differences.

11. The computer-implemented method of claim 1, wherein the tracking comprises:
    automatically switching the selected at least one data tracking technique to a different one of the at least one of the first and second data tracking techniques based at least in part on the one or more selection criteria.

12. A non-transitory processor-readable storage medium having stored therein program code of one or more software programs, wherein the program code when executed by at least one processing device causes the at least one processing device:
    to obtain a request to start tracking data differences between a plurality of data mirror volumes of a storage system, wherein the storage system is configured to apply at least a first data tracking technique that tracks the data differences using one or more bitmap records and a second data tracking technique that tracks the data differences using or more journal records;
    to select at least one of the first data tracking technique and the second data tracking technique using one or more selection criteria; and
    to track the data differences in accordance with the selected at least one data tracking technique.

13. The non-transitory processor-readable storage medium of claim 12, wherein:
    the first data tracking technique comprises a bitmap logging technique that stores the one or more bitmap records in one or more bitmap volumes; and
    the second data tracking technique comprises a journal logging technique that stores the one or more journal records in one or more journal volumes.

14. The non-transitory processor-readable storage medium of claim 12, wherein the one or more selection criteria comprise at least one of:
    an amount of storage available to at least to one of the first data tracking technique and the second data tracking technique;
    a number of volumes available to at least one of the first data tracking technique and the second data tracking technique to track the data differences; and
    a number of write operations that result in data differences between the plurality of data mirror volumes.

15. The non-transitory processor-readable storage medium of claim 12, wherein the at least one processing device is further caused:
    to monitor an amount of storage used by each of the first data tracking technique and the second data tracking technique.

16. The non-transitory processor-readable storage medium of claim 12, wherein the at least one processing device is further caused:
    to provide a common interface for the first data tracking technique and the second data tracking technique to one or more input-output drivers of the storage system.

17. The non-transitory processor-readable storage medium of claim 12, wherein the request is obtained in response to losing access to at least one of the plurality of data mirror volumes, and wherein the at least one processing device is further caused:
    in response to regaining access to the at least one of the plurality of data mirror volumes, to synchronize the at least one of the plurality of data mirror volumes based at least in part on the tracked data differences.

18. An apparatus comprising:
    at least one processing device comprising a processor coupled to a memory;
    the at least one processing device being configured:
    to obtain a request to start tracking data differences between a plurality of data mirror volumes of a storage system, wherein the storage system is configured to apply at least a first data tracking technique that tracks the data differences using one or more bitmap records and a second data tracking technique that tracks the data differences using or more journal records;
    to select at least one of the first data tracking technique and the second data tracking technique using one or more selection criteria; and
    to track the data differences in accordance with the selected at least one data tracking technique.

19. The apparatus of claim 18, wherein:
    the first data tracking technique comprises a bitmap logging technique that stores the one or more bitmap records in one or more bitmap volumes; and
    the second data tracking technique comprises a journal logging technique that stores the one or more journal records in one or more journal volumes.

20. The apparatus of claim 18, wherein the one or more selection criteria comprise at least one of:
    an amount of storage available to at least to one of the first data tracking technique and the second data tracking technique;

a number of volumes available to at least one of the first data tracking technique and the second data tracking technique to track the data differences; and a number of write operations that result in data differences between the plurality of data mirror volumes.

* * * * *